United States Patent [19]

Akao

[11] 4,331,725
[45] May 25, 1982

[54] WRAPPING MATERIALS

[75] Inventor: Mutsuo Akao, Minami-ashigara, Japan

[73] Assignee: Fuji Photo Film Co., Ltd., Kanagawa, Japan

[21] Appl. No.: 274,569

[22] Filed: Jun. 17, 1981

[30] Foreign Application Priority Data

Jun. 17, 1980 [JP] Japan .................................. 55-81572

[51] Int. Cl.³ .............................................. B32B 3/10
[52] U.S. Cl. .................................... 428/138; 428/910; 428/311.1; 428/316.6; 428/317.5; 428/319.9
[58] Field of Search ............... 428/137, 138, 310, 315, 428/910

[56] References Cited

U.S. PATENT DOCUMENTS

| | | | |
|---|---|---|---|
| 4,088,805 | 5/1978 | Wiegand | 428/310 |
| 4,147,291 | 4/1979 | Akao et al. | 428/910 |
| 4,258,848 | 3/1981 | Akao et al. | 428/218 |
| 4,285,998 | 8/1981 | Thibodeau | 428/138 |

Primary Examiner—William J. Van Balen
Attorney, Agent, or Firm—Sughrue, Mion, Zinn, Macpeak and Seas

[57] ABSTRACT

A wrapping material, which has excellent physical strength and which is suitable for use in making a bag, comprising two uniaxially-stretched thermoplastic resin films which are disposed in such a manner that the stretching directions of the two films intersect each other at an angle of 45° to 90° and an adhesive layer sandwiched between the two films wherein the adhesive layer has a plurality of holes perforating the adhesive layer in the form of a net.

12 Claims, 6 Drawing Figures

WRAPPING MATERIALS

FIELD OF THE INVENTION

The present invention relates to wrapping materials having excellent physical strength.

BACKGROUND OF THE INVENTION

In general, wrapping materials must have various characteristics depending on the type, shape, weight, etc. of the article to be wrapped therewith. Particularly, wrapping materials for use in making bags must have superior physical characteristics, that is, have excellent tear strength, tensile strength, burst strength, impact strength and so on.

Wrapping materials having such excellent physical strength have been proposed, for example, in Japanese Utility Model Application Laid-open Nos. 133631/77 (corresponding to U.S. Pat. No. 4,147,291) and 21168/80 (corresponding to U.S. Pat. No. 4,258,848 and G.B. Pat. No. 2,026,942A). These known wrapping materials are so-called cross-laminated film wrapping materials having the layer structure schematically illustrated in FIG. 1. More specifically, two uniaxially-stretched high density polyethylene films 1 and 2 are disposed so that their stretching axes form an angle of 45° to 90° with each other, and they are bonded together through an adhesive layer 3. As the adhesive layer 3, a thermoplastic resin, such as low density polyethylene, is usually employed. In some cases, however, films 1 and 2 may be heat-sealed at a suitable heating temperature of about 180° C., for example, without the application of the adhesive layer 3.

These cross-laminated film wrapping materials have satisfactory strength in any of longitudinal, lateral and oblique directions because the stretching axes intersect each other. Thus, compared with conventional wrapping materials, for example, composite laminate films comprising a low density polyethylene film and paper, an aluminum foil or the like, they have greatly improved physical strength.

It has been found, however, that the physical strength of the cross-laminated film wrapping material varies depending on the thickness of the adhesive layer 3 and that the physical strength decreases with increasing thickness. The reason for this is believed to be in bonding films 1 and 2 together with adhesive layer having a thickness which is beyond the critical value, they are completely united into a body and act as substantially one film although they are disposed in such a manner that their stretching axes intersect each other.

Therefore, it is necessary to minimize the thickness of the adhesive layer 3. However, if the thickness of the adhesive layer 3 is reduced excessively, breakage of the adhesive layer 3 will occur. This leads to a peelingoff of the films 1 and 2 at the part where breakage of the adhesive layer 3 occurs.

On the other hand, in the method where films 1 and 2 are heat-sealed, heat-shrinkage of the stretched film occurs at the areas heated. This results in the formation of wrinkles which are not desirable from the standpoint of quality.

SUMMARY OF THE INVENTION

An object of the invention is to provide a novel wrapping material which is free from the above-described drawbacks of conventional wrapping materials.

This invention, therefore, provides a wrapping material comprising two uniaxially-stretched thermoplastic resin films which are disposed in such a manner that their stretching axes from an angle of 45° to 90° and an adhesive layer interposed therebetween wherein the adhesive layer has a plurality of holes perforating the adhesive layer in the form of a net.

DETAILED DESCRIPTION OF THE INVENTION

The invention is explained in greater detail below by reference to the accompanying drawings.

Figure 2:
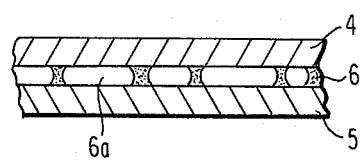
FIG. 2 is a cross-sectional view of a preferred embodiment of the wrapping material of this invention.

Referring to FIG. 2 which shows a cross-sectional view of a preferred embodiment of the invention, the wrapping material comprises uniaxially-stretched thermoplastic resin films 4 and 5, and an adhesive layer 6 having a plurality of holes 6a perforated therethrough such that the adhesive 6 has the form of a net.

The uniaxially-stretched thermoplastic resin films 4 and 5 can be made of any thermoplastic resin which can be uniaxially stretched. Considering availability, generalpurpose properties, production suitability and cost, polyethylene having various densities, polypropylene, polystyrene, polyvinylidene chloride, polyvinyl chloride, polycarbonate, polyethylene terephthalate, polyamide and the like, are preferably used. Of these films, a uniaxially-stretched high density polyethylene film having a density of 0.94 g/cm$^3$ or more is particularly preferred. These films may be stretched in any of the longitudinal, lateral and oblique directions to provide uniaxially-stretched thermoplastic resin films 4 and 5. In any case, these films must be disposed in such a manner that the stretching directions intersect with each other and form an angle of 45° to 90°.

The uniaxially-stretched thermoplstic resin films 4 and 5 may be oriented polymer films.

Figure 3:
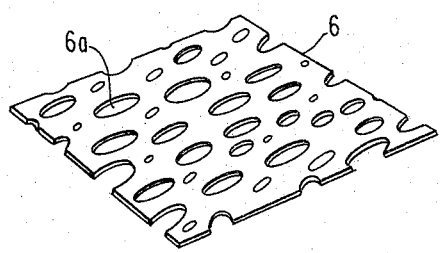
FIG. 3 is a perspective view of an adhesive layer.

For the preparation of the adhesive layer 6, known hot melt adhesives made of an ethylene-vinyl acetate copolymer, low molcular weight polyethylene and polyamide as well as thermoplastic resins, such as low density polyethylene, polypropylene, an ethylene-vinyl acetate copolymer, and an ionomer resin can be employed. In the preparation of the wrapping material of the invention, a suitable foaming agent, such as an inorganic foaming agent (e.g., sodium hydrogen carbonate), an organic foaming agent (e.g., diazoaminobenzene), or water, is added to the hot melt adhesive or the thermoplstic resin, and the mixture thus formed is extruded between the films 4 and 5 using a suitable coating apparatus. During the extrusion, an adhesive layer 6 as illustrated in FIG. 3, which has a plurality of holes perforated therethrough is formed in the form of a net, and which is interposed or sandwiched between films 4 and 5. For example, when a low density polyethylene resin is used, water is added as a foaming agent to the resin in an amount of 0.1 to 10% by weight prior to the melting thereof, and the mixture thus formed is extrusion-coated using the known T-die coating process.

Although the space occupied by the holes 6a in the adhesive layer 6 (hereinafter, referred to as "space ratio") will vary depending on the amount of water or foaming agent added, the space ratio is determined taking into account the physical strength which is required for the wrapping material. Usually, the space ratio is controlled within the range of about 5 to 90%, preferably 20 to 70%, more preferably 30 to 60%.

In the wrapping material of the invention, the two uniaxially-stretched thermoplastic resin films 4 and 5 are bonded together through the adhesive layer 6 having a plurality of holes perforated therethrough in the form of a net, in such a manner that the stretching directions of the films 4 and 5 intersect each other at an angle of 45° to 90°. The presence of the holes 6a in the adhesive layer 6 prevents the uniaxially-stretched thermoplastic resin films 4 and 5 from coming into contact with each other at least at the areas of the holes 6a. At these areas, therefore, a cross orientation effect (i.e., greatly increased tear strength obtained by intersection of the differing orientation directions of the films 4 and 5) of each film is produced and sufficient physical strength can be obtained.

Furthermore, the provision of the spaces or holes 6a reduces the amount of the adhesive to be used, that is the amount of the adhesive at least corresponding to the volume of the holes 6a can be reduced. This produces the advantage that as compared with conventional wrapping materials without holes, the production cost can be reduced.

Furthermore, the adhesive layer 6 is provided in a thickness sufficient to bond together uniaxially-stretched thermoplastic films 4 and 5 although the thickness will vary depending on the space ratio. Briefly, so long as the minimum thickness (usually, about 7 microns) to bond together the films 4 and 5 is maintained, any greater thickness can be selected. Thus, the preparation of the adhesive layer 6 can be simplified.

The following non-limiting example is given to illustrate the invention in greater detail.

EXAMPLE

Figure 1:
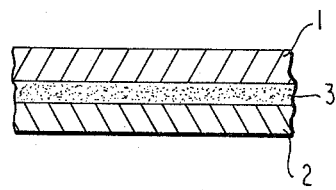
FIG. 1 is a cross-sectional view showing the layer structure of a conventional wrapping material.

A conventional wrapping material having the layer structure shown in FIG. 1 and a wrapping material of this invention having the layer structure shown in FIG. 2 were prepared and were compared as to physical strength and production cost.

The conventional wrapping material was prepared as follows:

Two 45μ thick uniaxially-stretched high density polyethylene films were disposed in such a manner that the stretching axes of the films intersected each other at an angle of 90°. Then, an adhesive layer composed of low density polyethylene was provided therebetween in a thickness of 20μ by extrusion coating, so that the films were bonded together to provide a wrapping material having a total thickness of 10μ.

The wrapping material of this invention was prepared as follows:

The same two 45μ thick uniaxially-stretched high density polyethylene films as used in the preparation of the conventional wrapping material were disposed in the same manner as in the preparation of the conventional wrapping material prepared as above, in such a manner that the stretching axes of the films intersected each other at an angle of 90°. Then, water was added as a foaming agent to a low density polyethylene in an amount of 1% by weight based on the low density polyethylene and, the resulting mixture was provided between the two uniaxially stretched films by extrusion coating followed by pressing with heatrollers, so that the films were bonded together through an adhesive layer having a plurality of holes in the form of a net (space ratio: 20%) to provide the wrapping material of this invention having a total thickness of 110μ.

The physical strength of the two wrapping materials thus formed was tested according to the test methods described below. The results obtained are shown in Table 1.

Tear Strength:

Measured by JIS P-8116-1976.

Abrasion Resistance:

Each wrapping material was used to make a bag. An article having a weight of about 5 kg was placed in the bag, and then the bag was sealed. After a vibration test according to JIS level II, the extent of damage of the surface of the wrapping material was evaluated.

Impact Perforation Strength:

Measured by JIS 8134.

TABLE 1

|  | Conventional Wrapping Material | Wrapping Material of This Invention |
| --- | --- | --- |
| Tear Strength |  |  |
| Longitudinal Direction | ○ 600 g | ⊙ 960 g |
| Lateral Direction | ○ 1,050 g | ⊙ 1,500 g |
| Impact Perforation Strength | ○ 4.8 kg . cm | ⊙ 8.5 kg . cm |
| Abrasion Resistance Production Cost* | ○ 100 | ⊙ 90 |

○: Excellent for practical use.
⊙: Particularly excellent for practical use.
*The production cost of the conventional wrapping material was set at 100 and the production cost of the wrapping material of this invention was compared relative thereto.

As can be seen from the results in Table 1, the wrapping material of this invention is superior in both physical strength and production cost to the conventional wrapping material.

The invention is not limited to the embodiment as described hereinbefore. For example, the following modifications can be made thereto.

Figure 4:
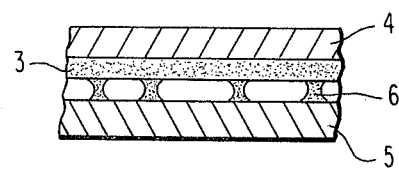
FIGS. 4 to 6 are cross-sectional views of other embodiments of the wrapping material of this invention.

FIG. 4 shows an embodiment wherein an adhesive layer 3 without holes is interposed in the wrapping material shown in FIG. 2, that is, the adhesive layer 3 without holes is sandwiched between one of the two uniaxiallystretched thermoplastic resin films and the adhesive layer having a plurality of holes in the form of a net.

Figure 5:
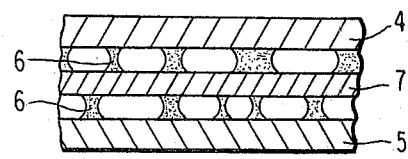
Figure 6:
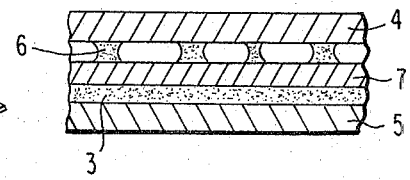

FIGS. 5 and 6 show wrapping materials wherein a flexible sheet 7 made of a synthetic resin film, paper, an aluminum foil or cloth is interposed between two adhesive layers. At least one adhesive layer of the two adhesive layers must be an adhesive layer having a plurality of holes in the form of a net of this invention. However, the other adhesive layer of the two adhesive layer may be an adhesive layer having a plurality of holes in the form of a net (FIG. 5) or an adhesive layer without holes (FIG. 6).

All the wrapping materials as shown in FIGS. 4, 5 and 6 are included within the scope of this invention, and appropriate structure can be selected depending on the application for which the wrapping material is used.

Although these wrapping materials have a complicated layer structure compared with the wrapping material shown in FIG. 2, they are further improved from the standpoint of physical strength.

As described in detail, the wrapping material of the invention has sufficiently satisfactory physical strength, and therefore when it is used in making a bag, the markedly significant practical advantages are obtained.

Further, the uniaxially-stretched thermoplastic resin film, the adhesive layer having a plurality of holes in the form of a net, the adhesive layer without holes and the flexible sheet may contain therein (i) an antistatic agent, (ii) a light-shielding agent such as carbon black, coloring pigments, aluminum powder, aluminum paste and coloring dyes, (iii) a slip agent and/or (iv) an antioxidant.

While the invention has been described in detail and with reference to specific embodiment thereof, it will be apparent to one skilled in the art that various changes and modifications can be made therein without departing from the spirit and scope thereof.

What is claimed is:

1. A wrapping material comprising at least (1) two uniaxially-stretched thermoplastic resin films which are disposed in such a manner that the stretching directions of the two films intersect each other at an angle of 45° to 90° and (2) an adhesive layer sandwiched between the two films wherein the adhesive layer has a plurality of holes perforating the adhesive layer in the form of a net.

2. A wrapping material as in claim 1 additionally comprising an adhesive layer without holes sandwiched between one of the two films and the adhesive layer having a plurality of holes in the form of a net.

3. A wrapping material as in claim 2 additionally comprising a flexible sheet sandwiched between the adhesive layer having a plurality of holes in the form of a net and the adhesive layer without holes.

4. A wrapping material as in claim 1 comprising the following laminate:
   (a) an uniaxially stretched thermoplastic resin film;
   (b) an adhesive layer having a plurality of holes in the form of a net;
   (c) a flexible sheet;
   (d) an adhesive layer having a plurality of holes in the form of a net; and
   (e) an uniaxially-stretched thermoplastic resin film disposed in such a manner that the stretching directions of the two films (a) and (e) intersect each other at an angle of 45° to 90°.

5. A wrapping material as in claim 1, wherein the uniaxially-stretched thermoplastic resin film is a polyolefin resin film.

6. A wrapping material as in claim 5, wherein the polyolefin resin film is a high density polyethylene film having a density of 0.94 g/cm$^3$ or more.

7. A wrapping material as in claim 1, wherein the adhesive layer having a plurality of holes in the form of a net has a space ratio of about 5 to 90%.

8. A wrapping material as in claim 1, wherein the adhesive layer having a plurality of holes in the form of a net is formed by extrusion coating after adding a foaming agent to a thermoplastic resin or a hot melt adhesive.

9. A wrapping material as in claim 8, wherein water is added as a foaming agent in an amount of 0.1 to 10% by weight.

10. A wrapping material as in claim 3 or 4, wherein one of the uniaxially-stretched film, the adhesive layer having a plurality of holes in the form of a net, the adhesive layer without holes, and the flexible sheet contains therein at least one of (i) an antistatic agent, (ii) an light-shielding agent, (iii) a slip agent, and (iv) an antioxidant.

11. A wrapping material as in claim 1, 5, 6, 7, 8 or 9, wherein one of the uniaxially-stretched film and the adhesive layer having a plurality of holes in the form of a net contains therein at least one of (i) an antistatic agent, (ii) a light-shielding agent, (iii) a slip agent, and (iv) an antioxidant.

12. A wrapping material as in claim 2, wherein one of the uniaxially-stretched film, the adhesive layer having a plurality of holes in the form of a net and the adhesive layer without holes contains therein at least one of (i) an antistatic agent, (ii) a light-shielding agent, (iii) a slip agent, and (iv) an antioxidant.

* * * * *